United States Patent
Han et al.

(10) Patent No.: US 8,458,510 B2
(45) Date of Patent: Jun. 4, 2013

(54) LPAR CREATION AND REPAIR FOR AUTOMATED ERROR RECOVERY

(75) Inventors: Xu Han, Lincoln, CA (US); Edward Hsiu-Wei Lin, Tucson, AZ (US); Yang Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/855,513

(22) Filed: Aug. 12, 2010

(65) Prior Publication Data
US 2012/0042198 A1  Feb. 16, 2012

(51) Int. Cl.
*G06F 11/00*  (2006.01)

(52) U.S. Cl.
USPC ............. 714/4.1; 714/4.4; 714/6.1; 714/6.21; 714/6.32; 714/43; 714/56

(58) Field of Classification Search
USPC ................. 714/4.1, 4.4, 6.1, 6.21, 6.31, 43, 714/56
See application file for complete search history.

(56) References Cited

U.S. PATENT DOCUMENTS

| | | | |
|---|---|---|---|
| 6,567,841 B1 | 5/2003 | Rooney et al. | |
| 7,350,050 B2 | 3/2008 | Nakamura et al. | |
| 7,793,139 B2 * | 9/2010 | Jain et al. | 714/4.2 |
| 8,015,431 B2 * | 9/2011 | Baba et al. | 714/4.1 |
| 2008/0091746 A1 | 4/2008 | Hatasaki et al. | |
| 2008/0163196 A1 | 7/2008 | Gimpl et al. | |
| 2008/0250219 A1 | 10/2008 | Shimada | |
| 2009/0055830 A1 | 2/2009 | Gusler et al. | |
| 2009/0119547 A1 * | 5/2009 | Hsu et al. | 714/43 |
| 2009/0138752 A1 * | 5/2009 | Graham et al. | 714/4 |
| 2009/0150504 A1 | 6/2009 | Graham et al. | |
| 2009/0276773 A1 | 11/2009 | Brown et al. | |
| 2009/0307458 A1 | 12/2009 | Nogueras et al. | |
| 2009/0307713 A1 | 12/2009 | Anderson et al. | |
| 2010/0122124 A1 * | 5/2010 | Chen et al. | 714/57 |
| 2011/0289205 A1 * | 11/2011 | Hansson et al. | 709/224 |

* cited by examiner

*Primary Examiner* — Joshua P Lottich
(74) *Attorney, Agent, or Firm* — Griffiths & Seaton PLLC

(57) ABSTRACT

Various embodiments for automated error recovery in a computing storage environment by a processor device are provided. In one embodiment, pursuant to performing one of creating a new and rebuilding an existing logical partition (LPAR) operable in the computing storage environment by a hardware management console (HMC) in communication with the LPAR, at least one failure scenario is evaluated by identifying error code. If a failure is caused by an operation of the HMC and a malfunction of a current network connection, a cleanup operation is performed on at least a portion of a current HMC configuration, an alternative network connection to the current network connection is made, and a retry operation is performed.

19 Claims, 3 Drawing Sheets

LPAR CREATION AND REPAIR FOR AUTOMATED ERROR RECOVERY

BACKGROUND OF THE INVENTION

1. Field of the Invention

The present invention relates in general to computers, and more particularly to apparatus, method and computer program product embodiments for LPAR creation and repair, for example, pursuant to automated error recovery in a computing storage environment.

2. Description of the Related Art

Storage facilities such as storage servers as commonly used by corporations and other organizations have high-capacity disk arrays to store large amounts of data from external host systems. A storage facility may also backup data from another storage facility, such as at a remote site. The IBM® Enterprise Storage Server (ESS) is an example of such a storage facility. Such facilities can access arrays of disks or other storage media to store and retrieve data. Moreover, redundant capabilities may be provided as a further safeguard against data loss. For example, a dual server system includes two separate servers that can access the same storage disks.

Moreover, storage facilities include several subsystems and components, referred to as updateable elements, each requiring its own unique update image and update commands. The elements are updated from time to time to provide new features or fix problems, for instance. Elements that may be updated include host adapters, device adapters, service processors, storage disks, power components, and so forth.

SUMMARY OF THE DESCRIBED EMBODIMENTS

In some cases, elements of storage facilities undergo at least a partial malfunction. In these cases, among other situations, it may be necessary to create or rebuild a logical partition (LPAR) operable in the storage facility to recover from such an error. Conventionally, a user, such as a system administrator, must manually take steps to perform these operations, often requiring travel to a remote computing site. Additionally, since a malfunction may involve examination of code to identify errors, the administrator may, in some cases, need to evaluate code to determine the scope and nature of a malfunction. This process adds cost and other resource expenditure to the overall operation of storage facilities.

In view of the foregoing, a need exists for an automated recovery mechanism for facilitating including creating and/or repairing LPARs as previously described. Accordingly, various embodiments for automated error recovery in a computing storage environment by a processor device are provided. In one embodiment, by way of example only, pursuant to performing one of creating a new and rebuilding an existing logical partition (LPAR) operable in the computing storage environment by a hardware management console (HMC) in communication with the LPAR, at least one failure scenario is evaluated by identifying error code. If a failure is caused by an operation of the HMC and a malfunction of a current network connection, a cleanup operation is performed on at least a portion of a current HMC configuration, an alternative network connection to the current network connection is made, and a retry operation is performed.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Creating or rebuilding a storage system logical partition may include the tasks of installing the operating system, any licensed storage system software and possibly configuration data, often via removable media (DVD/CDs). As previously mentioned, service personnel may be required to travel to a remote site to perform the installation and configuration processes using optical drives on the storage system hardware, such as a processor complexes.

Creating, maintaining and shipping the removable media incurs system maintenance cost, while the requirement for an optical media drive on the storage system adds cost to the product. Damages to the removable media or failure of the optical drives increase the probability of failure in the service process and lengthen the maintenance window. In addition, as previously mentioned, a conventional approach usually involves human interaction with code since instructions are printed on display terminals and service personnel need to enter selections as they proceed. Incorrect selections may lead to service process failure and more recovery time. Mistakes can be made in inserting the wrong media or inserting them in the wrong order, which also lead to process failure.

The process may take a longer time, especially for code installations where data is being read from the removable media and is written to the internal boot device such as a hard drive. Human interactions also prolong the process because of the time required to read and perform the instructions. Also, the service personnel may not be attending the process all the time due to breaks or distractions.

Designing and implementing a process that creates a storage system logical partition without accessing data from any removable media and optical drives, making the process executable remotely and without human interaction, can solve the aforementioned problems. Accordingly, the illustrated embodiments provide mechanisms for automated recovery operations, including replacement or repair of LPAR components as previously mentioned, for example, without the requirement of extensive on-site and/or remote support personnel, as will be further described.

Figure 1:
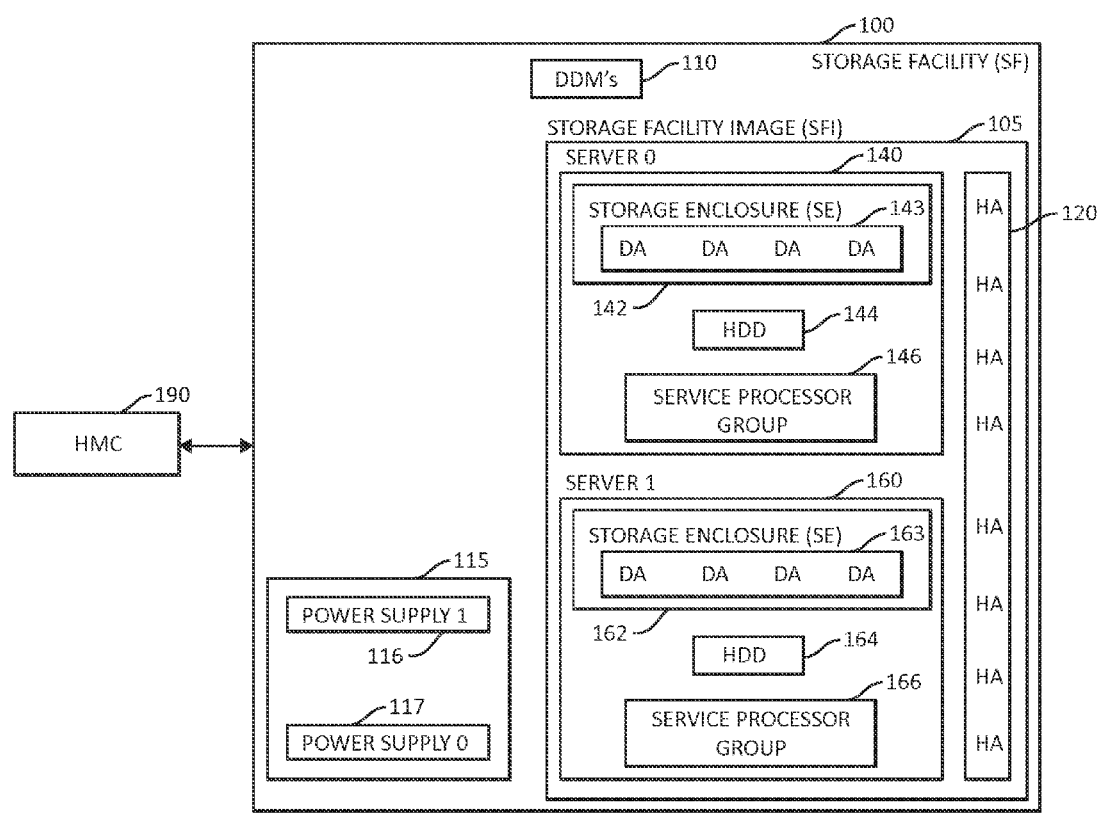
FIG. 1 is a block diagram of an exemplary storage facility capable of implementing various aspects of the present invention.

FIG. 1 illustrates a block diagram of an exemplary facility (i.e., Storage Facility) in which aspects of the present invention may be implemented. An overall product includes a Hardware Management Console (HMC) 190, such as a laptop computer, and at least one Storage Facility (SF) 100. The example Storage Facility (SF) 100 includes at least one Storage Facility Image (SFI) 105 and a power supply group 115, which includes power supplies 116 and 117. In particular, the power supply group 115 includes a rack power control (RPC) and a primary power supply (PPS), which may be treated as one unit for the purposes of the functionality described in the present invention. The SFI includes two servers (redundant servers) S0 (140) and S1 (160, and several disk drive modules (DDMs) 110, which are data storage devices for customer data, and several host adapters (HAs) 120. HAs are physical subunits of a storage server that provide the ability to attach to one or more host I/O interfaces.

Each server 140, 160 includes at least one hard disk drive (HDD) 144, 164, also referred to as a logical partition (LPAR), at least two device adapters (DAs), 143, 163, housed in at least one storage enclosure (SE) 142, 162, and a service processor group 146, 166, respectively, (sometimes referred to as Computer-Electronic Complexes (CECs)). A CEC is the set of hardware facilities associated with each server 140, 160. DAs are physical components of the Storage Facility 100 that provide communication between the servers 140, 160 and the DDMs 110.

Each of the HDDs 144, 164 has an operating system running on it, such as IBM®'s AIX 5 L operating system software, along with a driver, also referred to as SFI code. The SFI has numerous components with code for each component. The SFI code can be thought of as the main code which coordinates the activities of most of the other components and code. One aspect of the illustrated embodiments involves, in part, updating the operating system and SFI code onto the HDDs 144, 164. The service processor groups 146, 166 and the HDDs 144, 164, respectively, combine to provide the server foundation, yet the server is incomplete without the other elements.

According to one embodiment of the present invention, and as will be further described, to facilitate various aspects of the illustrated embodiments, such as establishing a new LPAR 144, 164 or rebuilding an existing LPAR 144, 164, HMC 190 may be configured as a data storage device to replace the need of removable media and optical drives previously required to facilitate such functionality. In this regard, the HMC 190 may, in one embodiment, be configured as a network installation management server. In addition, the storage LPAR 144, 164 may be configured as a client that receives the software installation, administration, and configuration services from the HMC 190. Accordingly, these configurations, performing automated processes as will be further described, serve to reduce or eliminate human interaction, as well as the need to travel to the site where the storage system hardware locates. The fully automated process serves to avoid human mistakes and enables automatic failure recovery.

In one embodiment, the creation of an exemplary LPAR 144, 164 by the HMC 190 may be described as follows. First, data required to create the LPAR 144, 164 is stored on the HMC 190. When the creation/repair process begins, an image of an operating system is installed from the HMC 190 using network installation techniques. After the installation of the operating system, the storage system LPAR 144, 164 becomes a bootable device. Its code may continue to interact with the HMC 190 for further data transfer, software installation, configuration and event timing. Finally, an automated self-recovery process may be implemented on both the storage system LPAR 144, 164 side as well as the HMC 190 side. The process may be resumed from the point of failure instead of a repeating from the beginning of the process. When a new logical partition is to be created or a failed logical partition needs to be rebuilt for a storage facility, the service personnel can simply invoke a service action remotely from the web user interface of HMC 190.

Such an implementation provides several advantages. In one embodiment, service processes are made more reliable by eliminating removable media (DVD/CDs), optical drives and human-code interactions from the process. The time required for the service process may be reduced significantly without using optical drives to access data, and without relying on human interaction to make progress during the service process. Service processes can be performed remotely via the HMC 190's Web User Interface without attending to the storage system hardware. To this regard, failures may be detected and recovery may be attempted automatically by code instead of waiting for service personnel to discover the problem and take action.

In addition, no removable media is required to store data for creating a logical partition and no optical drives are required on the storage product processor complex. Service personnel travel expenses are thereby reduced, and the maintenance window is shortened significantly, helping to reduce labor cost while increasing customer satisfaction.

When creating or rebuilding a storage system logical partition, the storage system is either inoperative or running on the remaining partitions with less redundancy. Therefore, when the creation process fails, customer down time or the risk of customer impact event increases significantly. Any attempt to automatically correct the problem and complete the process help reduce such risk. Even if the problem cannot be corrected at the moment, bypassing the problem to complete the process is equally helpful and important. In one embodiment, the following functionality may be implemented to facilitate automated error recovery. First, if a problem stemming from the HMC is determined to have caused a failure, the mechanisms of the present invention evaluate failure scenarios by identifying error code. If the problem is determined to be network failure related, the current HMC configuration undergoes a cleanup operation, the applicable network connection is switched to alternative network connection, and a retry operation is performed.

If the problem stemming from an LPAR creation/rebuilding operation is determined to have caused the failure, the mechanisms of the present invention again evaluate failure scenarios by identifying error code. If the problem is determined to be network failure related, a clean up operation on at least a portion of the current configuration of the LPAR in question, the alternative network connection may be tried, and the retry operation may again be performed. For problems determined not to be network failure related, the retry operation may be performed for a predetermined number of attempts. This helps to avoid repeating a potentially lengthy operating system installation process, which increases partition down time and/or consumer service time.

In one exemplary embodiment, the mechanisms of the present invention may, on the HMC 190, be adapted to perform the following tasks. As one of ordinary skill in the art will appreciate, these tasks may be implemented using various portions of code, for example. First, the HMC 190 may verify required data for creating the logical partition 144, 164, such as operating system image, code update packages, and network installation resources have been set up on the HMC. The HMC 190 may collect system and network information for the HMC and for the logical partition 144, 164 to be created, run health checks and back up critical configuration files that could be modified. The HMC 190 may connect to a peer-running partition to package and transfer previously backed up partition configuration data to the HMC. The configuration data will be applied to the partition 144, 164 once it is created. The HMC 190 may establish a server environment using the Network Installation Management on Linux® (NIMOL) technology via the nimol_config command, for example.

Further, the HMC 190 may establish a client for operating system installation, such as the aforementioned AIX®, for example, using the nimol_install command. The client configuration will be applied to the storage system logical partition 144, 164. The HMC 190 may use the lpar_netboot command to shut down and boot the partition via its network adapter. To this regard, it may monitor AIX® installation processes by executing an event timer, and receive message from the partition via a Network File System (NFS). Once the operating system installation and partition is able to reboot, and run its programs, the HMC 190 may then continue to monitor the partition operation via NFS.

As will be further described in detail, if failures are detected during the configuration processes described above, either with regard to a new partition or a rebuild of an existing partition, various cleanup operations may be performed, an alternative network connection may be used, and retry operations may be subsequently performed. Regardless of the outcome (success or failure), operation results may be reported via the aforementioned web user interface, to service personnel.

In similar fashion to the above, in one exemplary embodiment, the mechanisms of the present invention may, new or repaired LPAR 144, 164, be adapted to perform the following tasks. Such tasks again may be implemented by various code as previously indicated. First, the mechanisms for configuring the partition after the operating system installation is obtained from the network installation resources prepared on the HMC 190. The mechanisms may be configured to run as a first_boot process once the logical partition is created. The mechanisms may communicate via network connection to the HMC 190 via NFS to obtain additional data or information, such as additional code packages, and install such data on the partition 144, 164. The mechanisms may establish the partition 144, 164, including file systems, user administration, network configuration, and other services, in the manner required by the storage system/storage facility runtime environment. With each step along the way for installation and configuration, the mechanisms may post progress or error messages to the HMC 190 via NFS, for example. In case of a failure, the mechanisms record the current progress on the partition 144, 164; and if exemplary functionality is enabled, resumes a failed process from the point of failure without restarting from the beginning of the LPAR configuration process.

Figure 2:
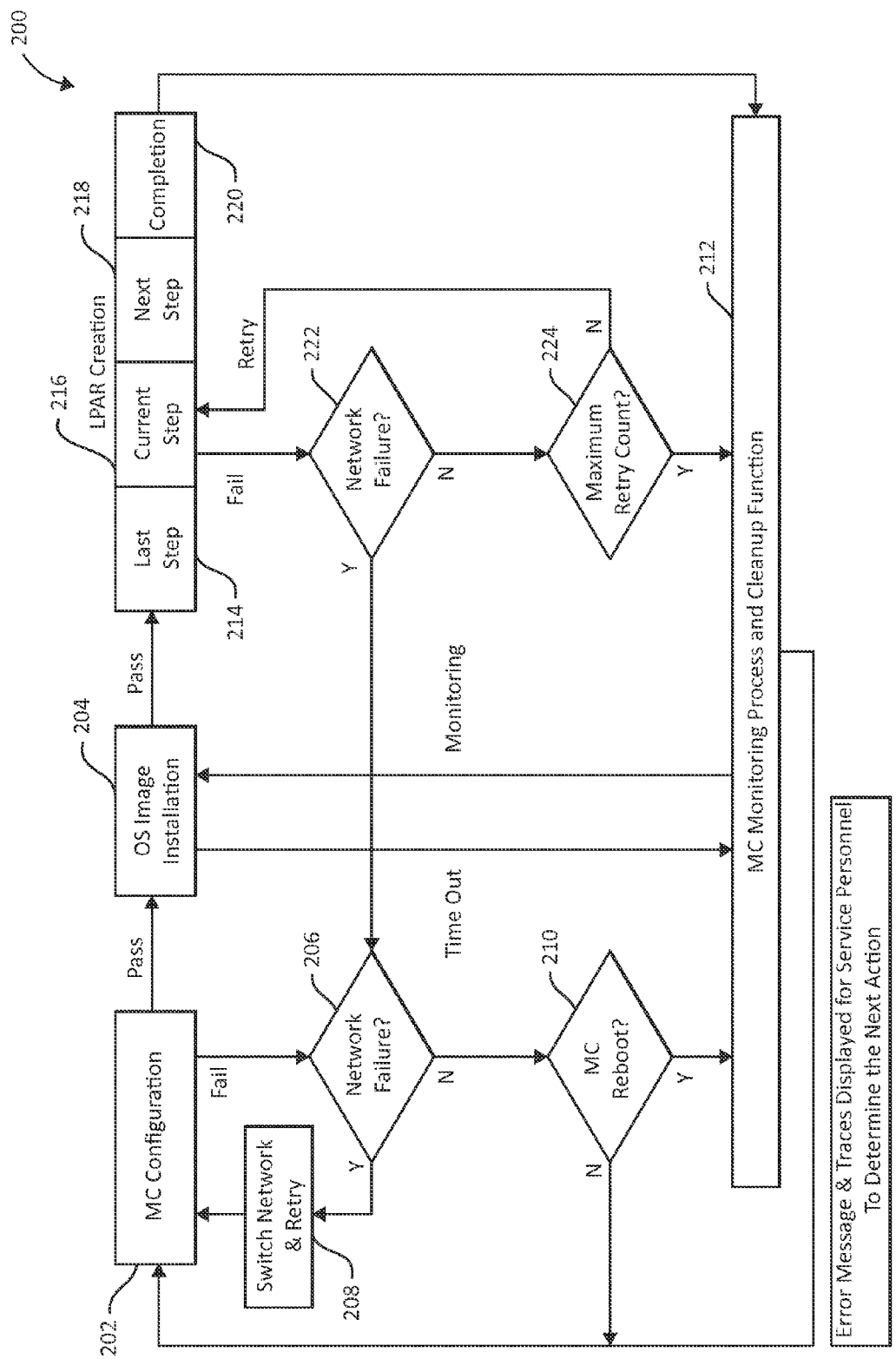
FIG. 2 is a flow chart diagram of an exemplary method 200 for implementing a new/repaired LPAR in the context of an error recovery scenario, in which various aspects of the present invention and following claimed subject matter may be implemented.

Turning to FIG. 2, following, an exemplary method 200 for automated partition creation/repair and error recovery in a computing environment according to aspects of the present invention (such as a storage facility in a computing storage environment) is illustrated in flow chart diagram format. As one of ordinary skill in the art will appreciate, various steps in the method 200 may be implemented in differing ways to suit a particular application. In addition, the described method 200 may be implemented by various means, such as hardware, software, firmware, or a combination thereof operational on or otherwise associated with the computing environment. For example, the method 200 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 200 shows a management console (MC) configuration as an exemplary step 202. The establishment of the HMC as a network installation management server, including providing communications functionality with the partition via various networking protocols such as NFS, has been previously described. Once this occurs satisfactorily, an operating system (OS) image is installed from the HMC 190 using network installation techniques as previously indicated in step 204. Returning to step 202, if the MC configuration undergoes a malfunction, the method 200 queries whether the malfunction is a network-related failure (step 206). If so, an alternative network connection is made (step 208), and the configuration step(s) are retried.

If the method 200 determines that a non network-related failure has occurred (again, step 206), the method 200 determines whether a MC reboot was found to be the cause of the process failure (step 210) (or, in other embodiments, if another problem relating specifically to an operation of the management console as previously indicated). If no, the method 200 returns to step 202 as indicated, as a cleanup effort is not required since execution of the process without a disruptive MC boot could automatically refresh the configuration. Alternatively, if a MC reboot is identified as a cause of the process failure, one or more cleanup operations relating to the MC operation are performed (step 212), and the method returns to step 202. Returning to step 204, if the OS image times out, the method moves again to step 212 to perform functionality as previously described. As one of ordinary skill in the art will appreciate, the cleanup steps may vary according to a particular situation. For example, a cleanup operation may be performed relating specifically to the OS image installation in the present example.

Returning to step 204, if the OS image installation process proceeds satisfactorily, the method moves to a series of LPAR creation/repair processes 214, 216, 218, and 220. As indicated, the LPAR creation processes are broken down into a series of steps, including a last step 214, a current step 216, a next step 218, and a completion step 220. For the current step 216, if a failure occurs, the method 200 again queries if the failure is network-related (step 222). If so, the method moves through step 206 to step 208 as previously described. If a network-related failure has not occurred, the method 200 queries whether a maximum retry count has occurred (step 224). If not, the method 200 retries the current step (returning to step 216). If yes, the method 200 moves to step 212, where again, a particular MC monitoring process and cleanup function step relating specifically to the current step being performed is executed. Returning to step 220, once the LPAR creation/repair process is complete, the method 200 moves to step 212 to continue a MC monitoring process as previously described.

Figure 3:
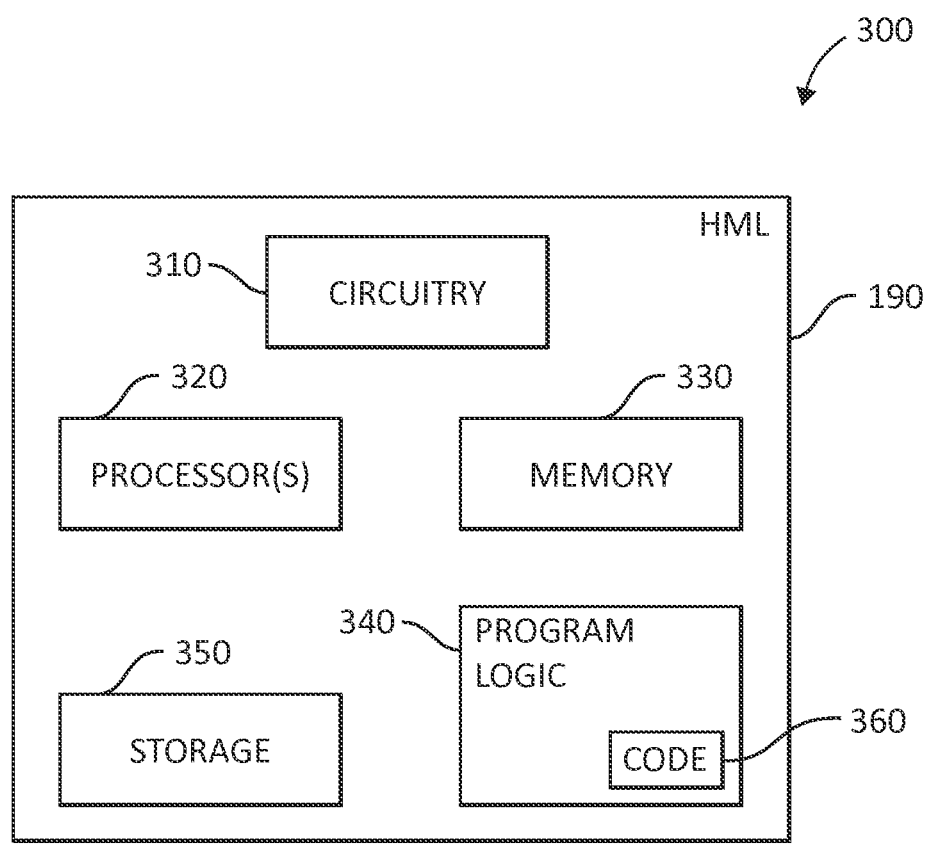
FIG. 3 is a block diagram of various exemplary components in a hardware management console (HMC), again in which various aspects of the present invention may be implemented.

FIG. 3, following, is a block diagram of various exemplary components in an HMC 190 configured as a network installation management server, as one of ordinary skill in the art will appreciate. The HMC 190 may include circuitry 310 that may, in certain embodiments include one or more processor devices. The HMC 190 may also include a memory 330 (e.g., a volatile memory device), and storage 350. The storage 350 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 350 may comprise an internal storage device, an attached storage device and/or a network accessible storage device. The HMC 190 may include a program logic 340 including code 360 that may be loaded into the memory 330 and executed by the processor(s) 320 or circuitry 310 (or elsewhere, such as the LPAR as previously described). In certain embodiments, the program logic 340 including code 360 may be stored in the storage 350. In certain other embodiments, the program logic 340 may be implemented in the circuitry 310. Therefore, while FIG. 3 shows the program logic 340 separately from the other elements, the program logic 340 may be implemented in the memory 330 and/or the circuitry 310.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for automated error recovery in a computing storage environment by a processor device, comprising:
pursuant to performing one of creating a new and rebuilding an existing logical partition (LPAR) operable in the computing storage environment by a hardware management console (HMC) in communication with the LPAR, evaluating at least one failure scenario by identifying error code, wherein:
if a failure is caused by an operation of the HMC and a malfunction of a current network connection, a cleanup operation is performed on at least a portion of a current HMC configuration, an alternative network connection to the current network connection is made, and a retry operation is performed.

2. The method of claim 1, wherein if the failure is caused by an operation of the LPAR:

if the failure is additionally caused by the malfunction of the current network connection, the cleanup operation is performed on at least a portion of a current LPAR configuration, the alternative network connection to the current network connection is made, and the retry operation is performed, and if the failure is additionally not caused by the malfunction of the current network connection, the retry operation is performed for at least one of a plurality of attempts.

3. The method of claim 1, further including determining one of if the failure is caused by the operation of the HMC and the LPAR.

4. The method of claim 1, further including determining if the failure is caused by the malfunction of the current network connection.

5. The method of claim 1, further including configuring the HMC as a network installation management server for performing the one of creating the new and rebuilding the existing LPAR.

6. The method of claim 5, further including configuring the LPAR as a client adapted to receive at least one of a software installation, administration, and configuration services operation.

7. A hardware system for automated error recovery in a computing storage environment, comprising:
   a processor device, operable in the computing storage environment, wherein the processor device is adapted for:
      pursuant to performing one of creating a new and rebuilding an existing logical partition (LPAR) operable in the computing storage environment by a hardware management console (HMC) in communication with the LPAR, evaluating at least one failure scenario by identifying error code, wherein:
         if a failure is caused by an operation of the HMC and a malfunction of a current network connection, a cleanup operation is performed on at least a portion of a current HMC configuration, an alternative network connection to the current network connection is made, and a retry operation is performed.

8. The system of claim 7, wherein the processor device is further adapted for, if the failure is caused by an operation of the LPAR:
   if the failure is additionally caused by the malfunction of the current network connection, the cleanup operation is performed on at least a portion of a current LPAR configuration, the alternative network connection to the current network connection is made, and the retry operation is performed, and
   if the failure is additionally not caused by the malfunction of the current network connection, the retry operation is performed for at least one of a plurality of attempts.

9. The system of claim 7, wherein the processor device is further adapted for determining one of if the failure is caused by the operation of the HMC and the LPAR.

10. The system of claim 7, wherein the processor device is further adapted for determining if the failure is caused by the malfunction of the current network connection.

11. The system of claim 7, wherein the processor device is further adapted for configuring the HMC as a network installation management server for performing the one of creating the new and rebuilding the existing LPAR.

12. The system of claim 7, wherein the processor device is further adapted for configuring the LPAR as a client adapted to receive at least one of a software installation, administration, and configuration services operation.

13. The system of claim 7, wherein the LPAR and the HMC communicate over one of the current and the alternative network connection using a network file system (NFS) protocol.

14. A computer program product for automated error recovery in a computing storage environment by a processor device, the computer program product comprising a non-transitory computer-readable storage medium having computer-readable program code portions stored therein, the computer-readable program code portions comprising:
   a first executable portion for, pursuant to performing one of creating a new and rebuilding an existing logical partition (LPAR) operable in the computing storage environment by a hardware management console (HMC) in communication with the LPAR, evaluating at least one failure scenario by identifying error code, wherein:
      if a failure is caused by an operation of the HMC and a malfunction of a current network connection, a cleanup operation is performed on at least a portion of a current HMC configuration, an alternative network connection to the current network connection is made, and a retry operation is performed.

15. The computer program product of claim 14, further including a second executable portion for, if the failure is caused by an operation of the LPAR:
   if the failure is additionally caused by the malfunction of the current network connection, the cleanup operation is performed on at least a portion of a current LPAR configuration, the alternative network connection to the current network connection is made, and the retry operation is performed, and
   if the failure is additionally not caused by the malfunction of the current network connection, the retry operation is performed for at least one of a plurality of attempts.

16. The computer program product of claim 14, further including a second executable portion for determining one of if the failure is caused by the operation of the HMC and the LPAR.

17. The computer program product of claim 14, further including a second executable portion for determining if the failure is caused by the malfunction of the current network connection.

18. The computer program product of claim 14, further including a second executable portion for configuring the HMC as a network installation management server for performing the one of creating the new and rebuilding the existing LPAR.

19. The computer program product of claim 18, further including a third executable portion for configuring the LPAR as a client adapted to receive at least one of a software installation, administration, and configuration services operation.

* * * * *